June 16, 1942.  H. SCOTT-PAINE  2,286,764
TORPEDO TUBE
Filed Dec. 7, 1940  9 Sheets-Sheet 1
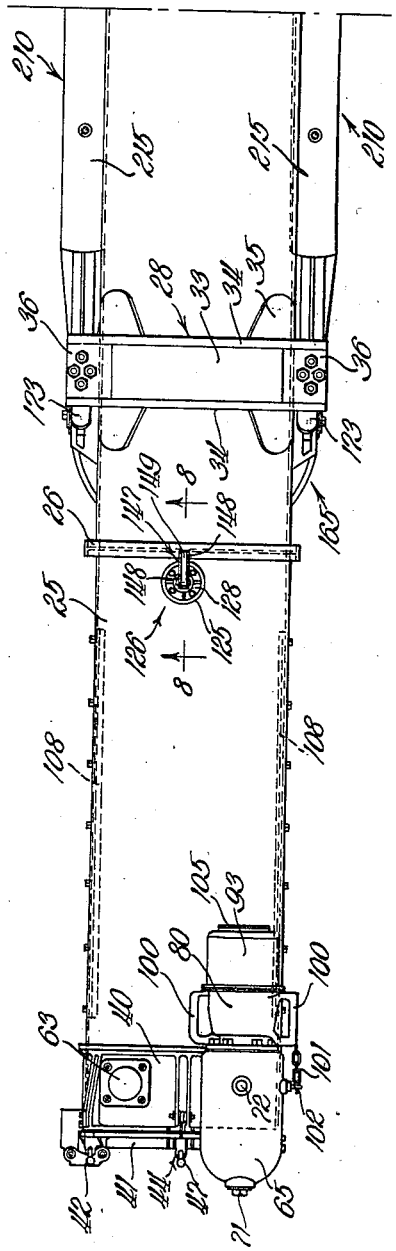
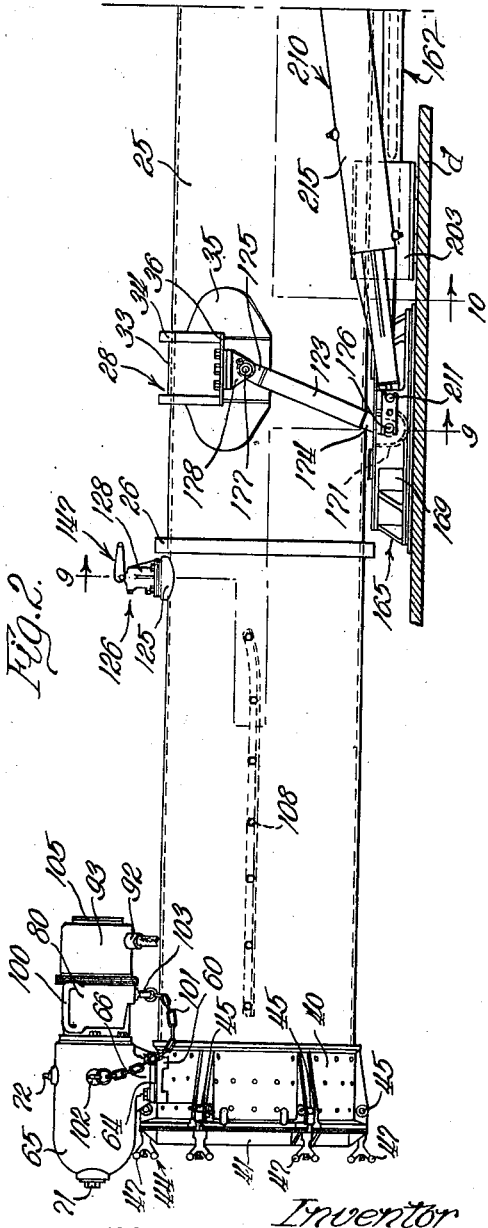
Inventor
Hubert Scott-Paine
By Brown, Jackson, Boettcher & Dienner
Attys.

June 16, 1942.  H. SCOTT-PAINE  2,286,764
TORPEDO TUBE
Filed Dec. 7, 1940  9 Sheets-Sheet 2
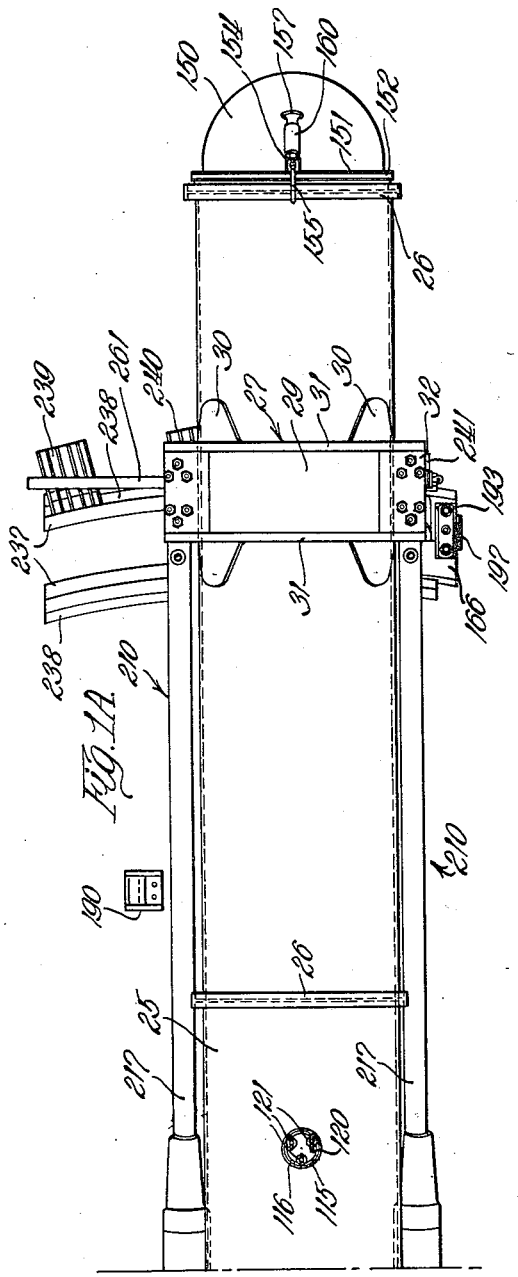
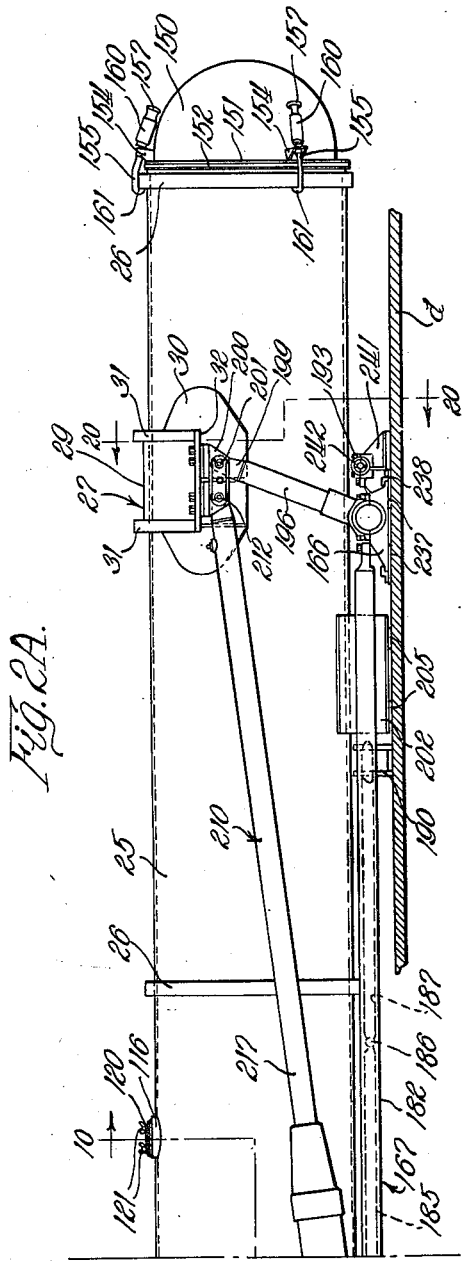
Inventor
Hubert Scott-Paine
By [signature]
Att'ys.

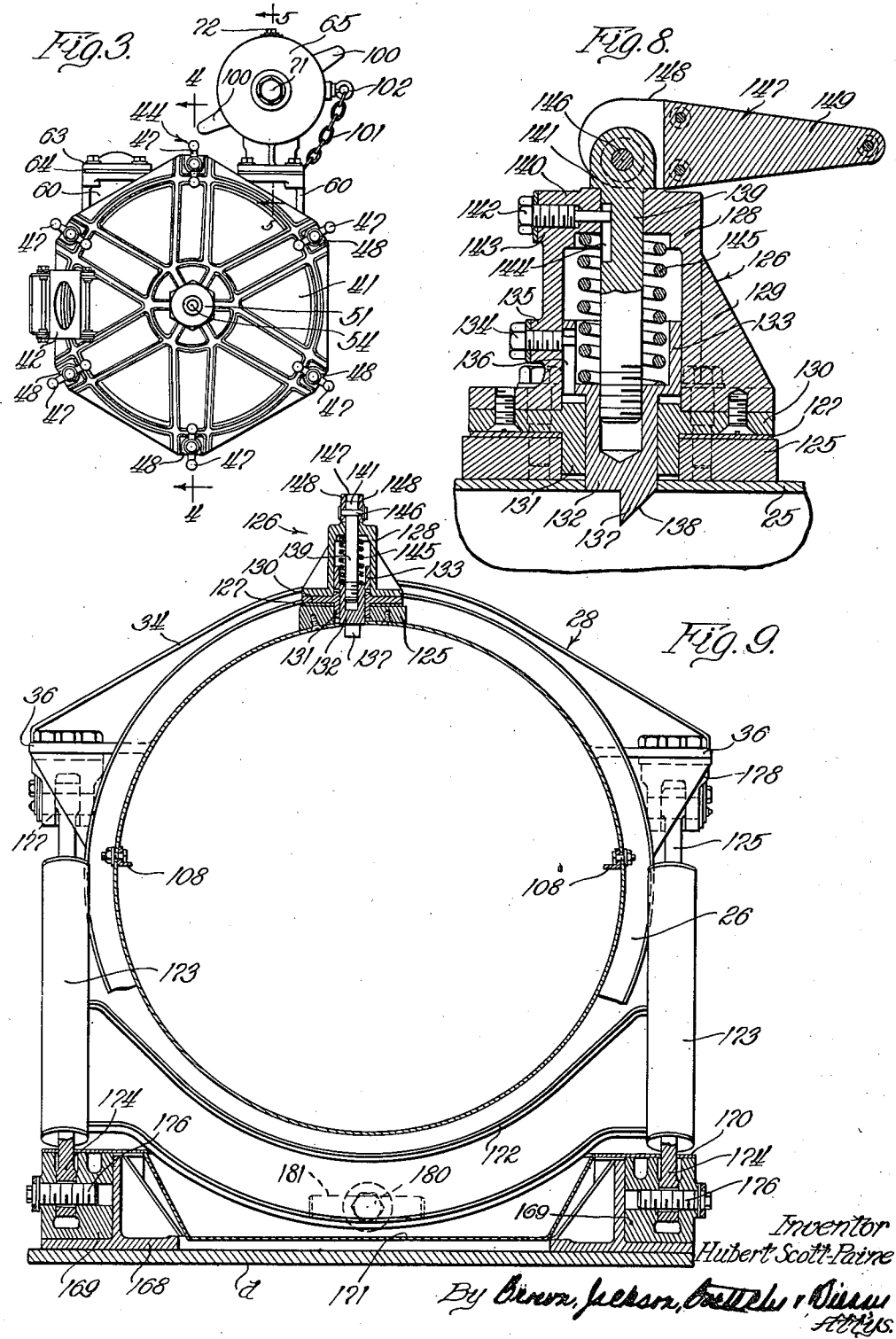

June 16, 1942. H. SCOTT-PAINE 2,286,764
TORPEDO TUBE
Filed Dec. 7, 1940 9 Sheets-Sheet 4
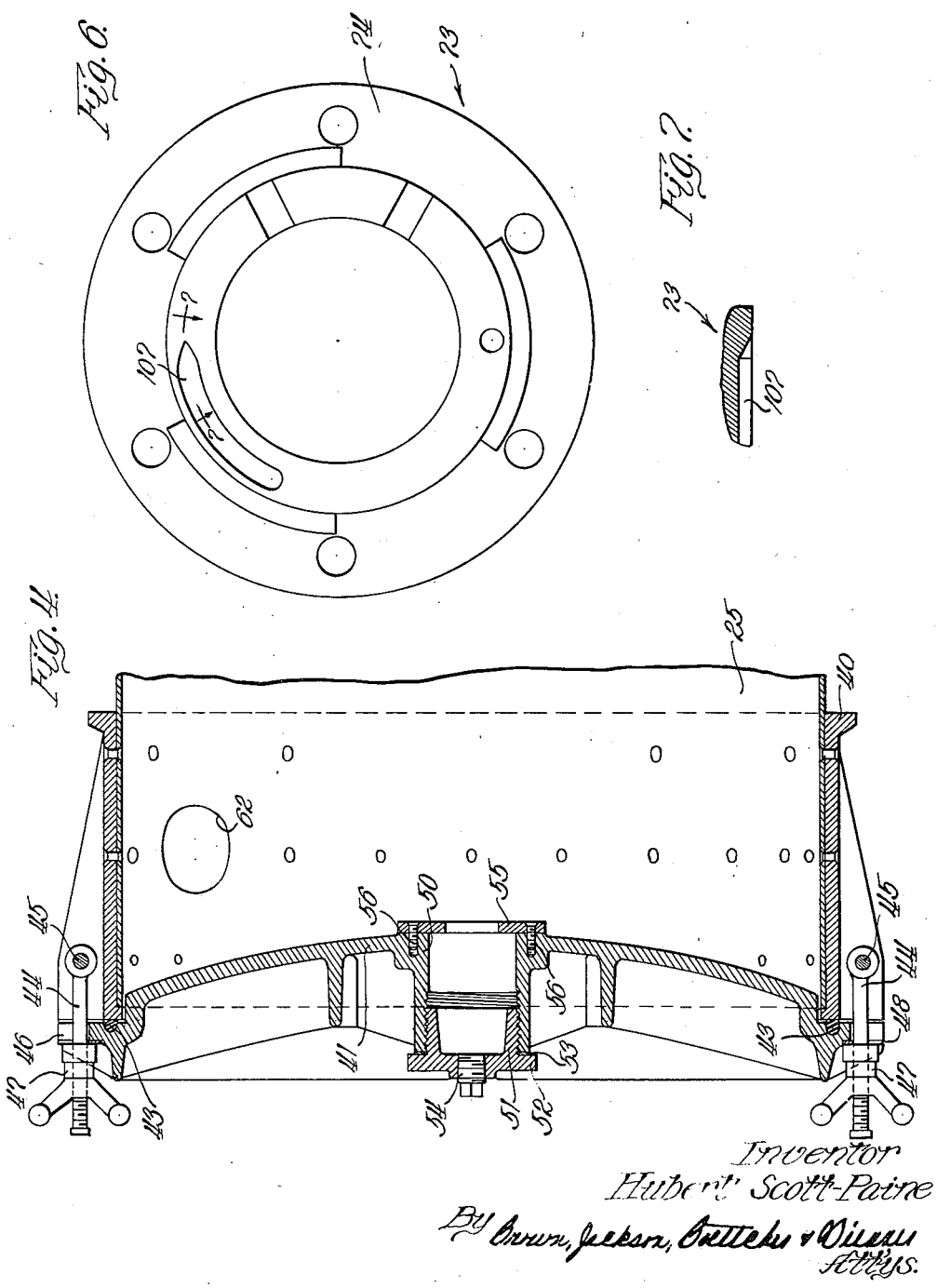
Inventor
Hubert Scott-Paine
By Brown, Jackson, Boettcher & Dienner
Attys.

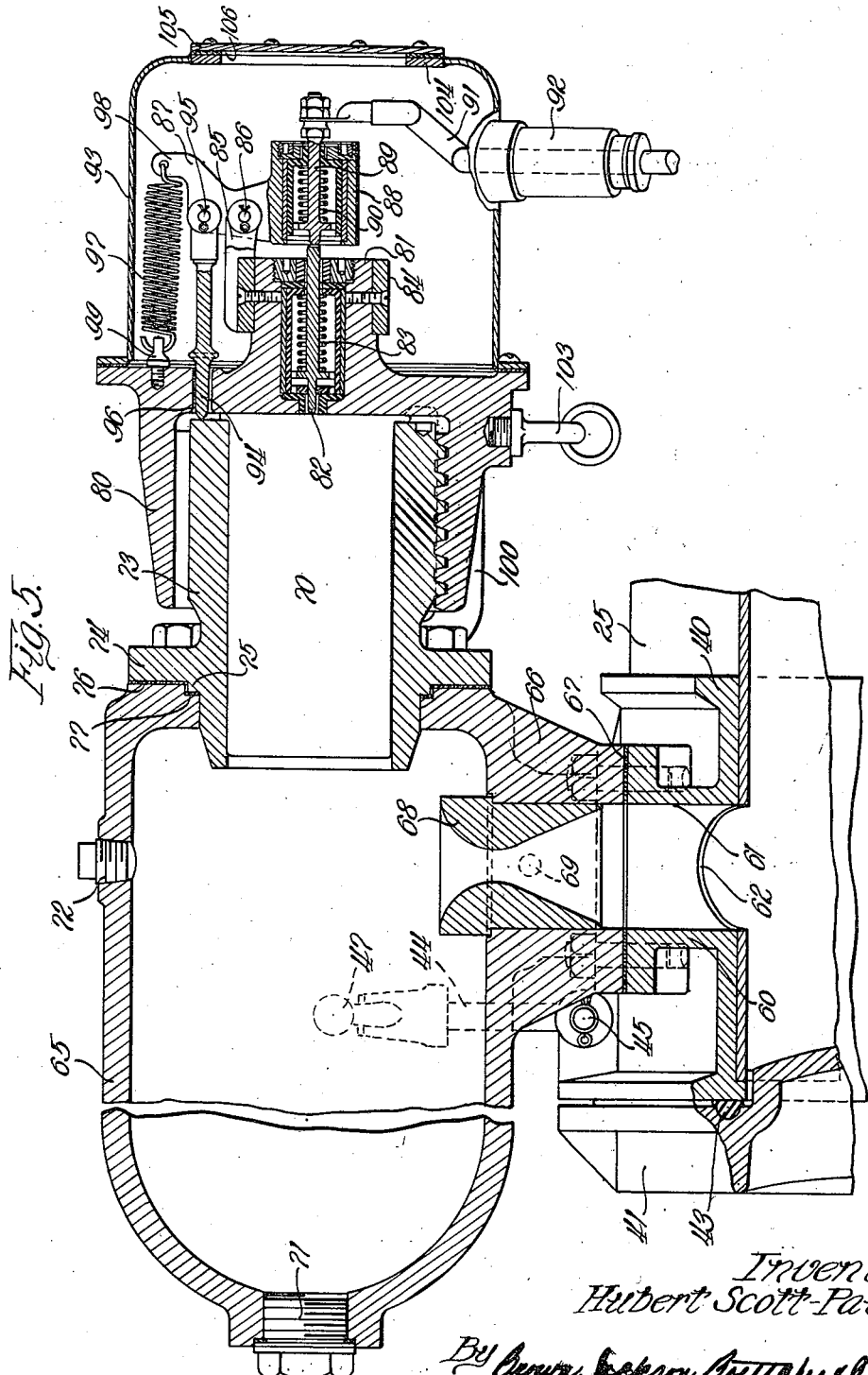

June 16, 1942.  H. SCOTT-PAINE  2,286,764
TORPEDO TUBE
Filed Dec. 7, 1940  9 Sheets-Sheet 6
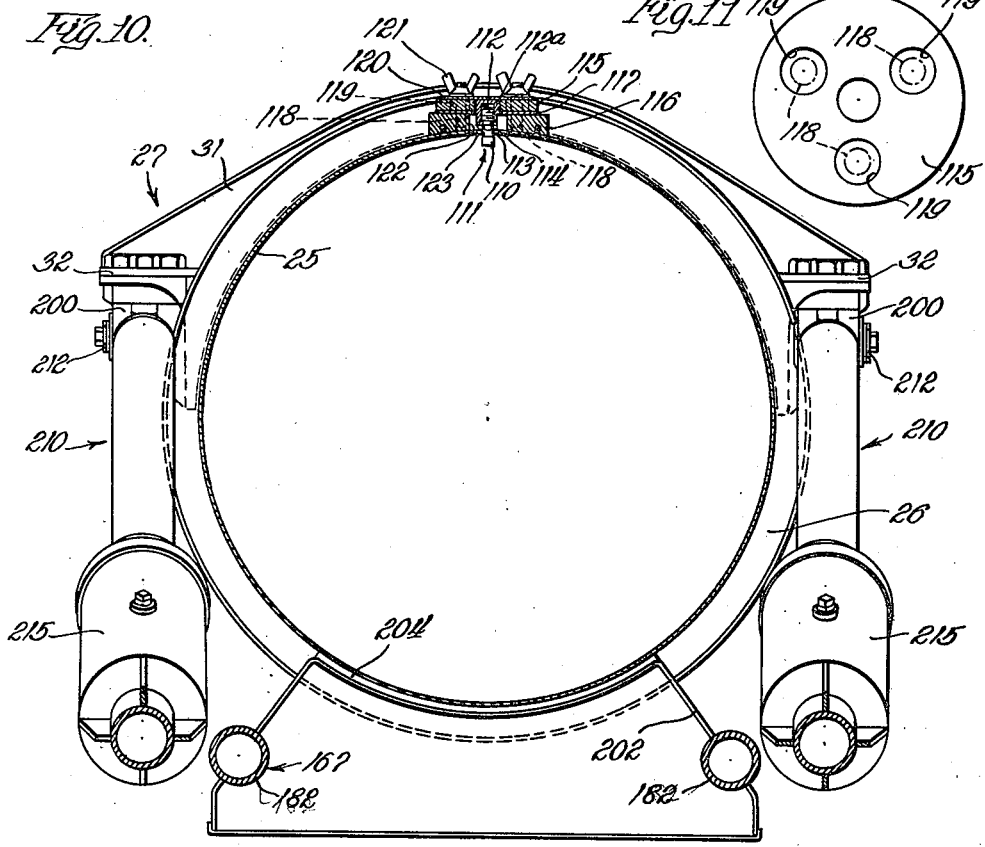
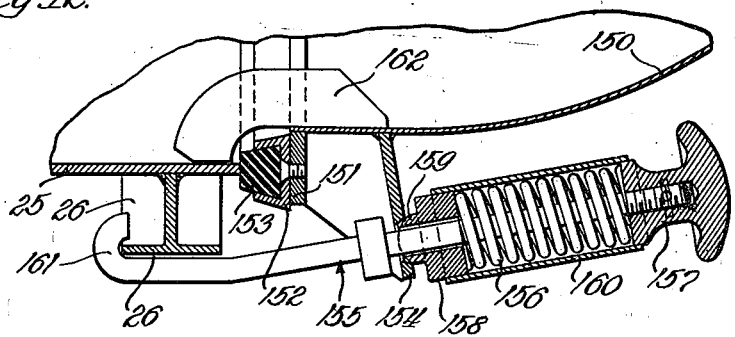
Inventor
Hubert Scott-Paine

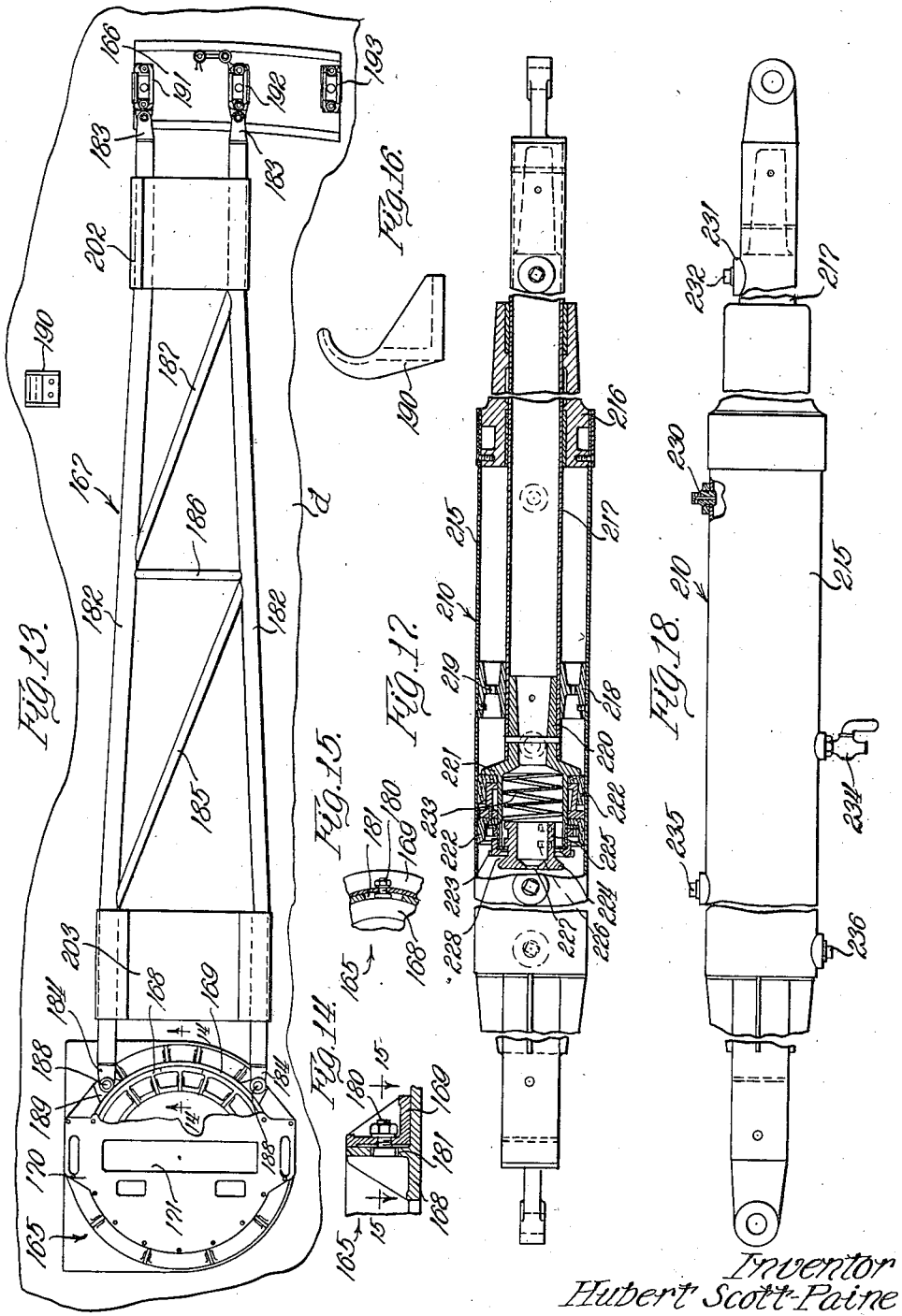

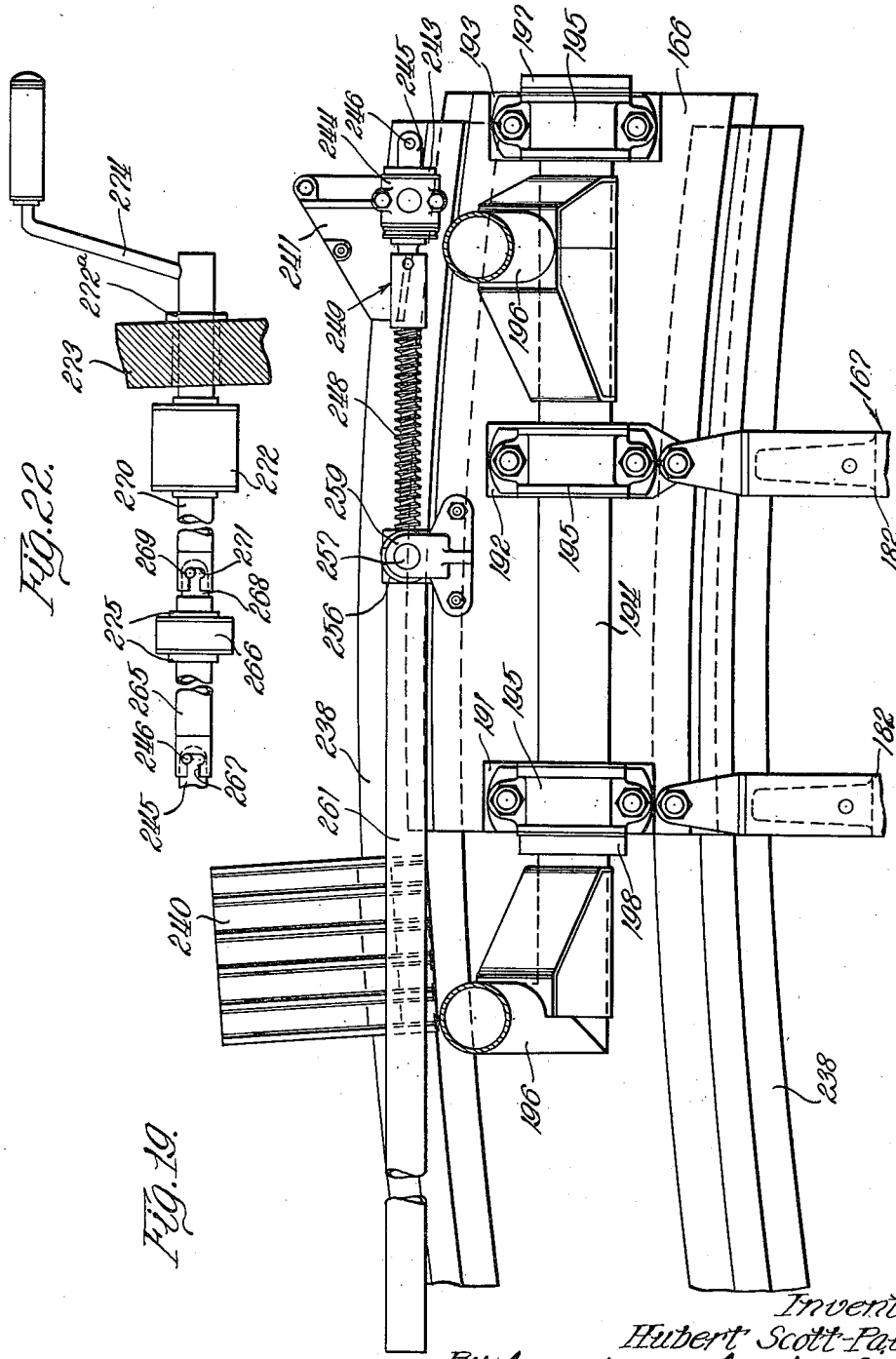

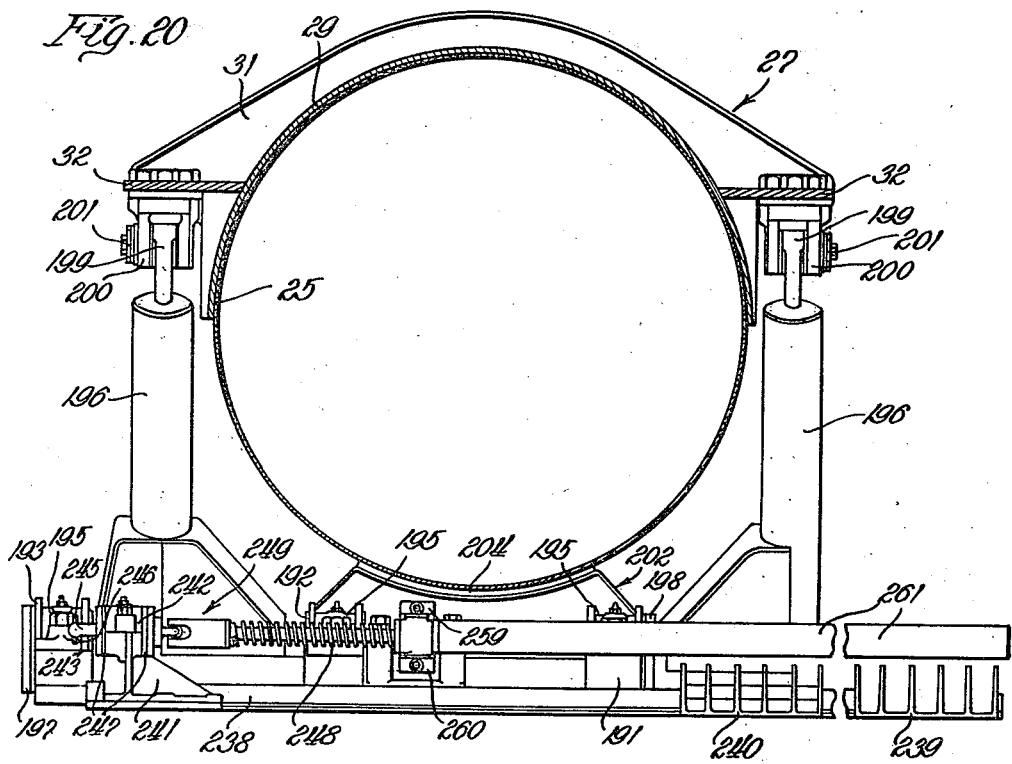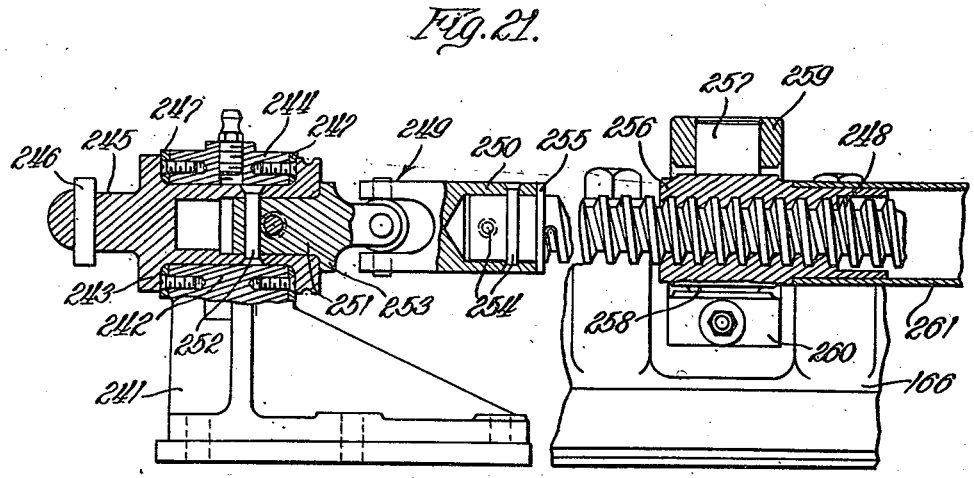

Patented June 16, 1942

2,286,764

UNITED STATES PATENT OFFICE 2,286,764

TORPEDO TUBE

Hubert Scott-Paine, Hythe, Southampton, England

Application December 7, 1940, Serial No. 368,965

7 Claims. (Cl. 114—239)

This invention relates to torpedo tubes, including the mounting and training means therefor, and has to do with torpedo tubes intended for use on relatively small, high speed surface motor torpedo boats.

My invention is directed to a torpedo tube having a minimum over-all weight and provided with supporting means including recoil take-up means of such character that the reaction of the torpedo discharge will not subject a light hull structure to objectionable local stresses, the supporting means also providing means for training the tube from within the boat housing. I also provide means for effecting ejection of the torpedo from the tube without necessity of providing a supply of compressed air, the tube being thus self-contained and the arrangement of parts such that the combat operations of training and discharge of the torpedo from the tube can be effected from points within the boat housing, so that no member of the crew may be unnecessarily exposed to the elements or to enemy fire.

Further objects and advantages of my invention will appear from the detail description.

In the drawings:

Figures 1 and 1A, taken together, are a plan view of a torpedo tube, including the supporting and training means therefor, embodying my invention;

Figures 2 and 2A, taken together, are an inboard side view of the tube and the supporting and training means therefor of Figures 1 and 1A.

Figure 3 is an after end view of the tube;

Figure 4 is a sectional view taken substantially on line 4—4 of Figure 3, on an enlarged scale;

Figure 5 is a sectional view taken substantially on line 5—5 of Figure 3, on an enlarged scale, parts being broken away and certain parts being shown in elevation;

Figure 6 is a forward end view of the breech member of the combustion chamber;

Figure 7 is a fragmentary sectional view taken subtantially on line 7—7 of Figure 6;

Figure 8 is a sectional view, on an enlarged scale, taken substantially on line 8—8 of Figure 1, certain parts being broken away and shown partly in elevation, and certain other parts being shown in elevation;

Figure 9 is a sectional view, on an enlarged scale, taken substantially on line 9—9 of Figure 2, certain parts being shown in elevation;

Figure 10 is a sectional view, on an enlarged scale, taken substantially on line 10—10 of Figures 2 and 2A;

Figures 11 is a plan view, on an enlarged scale, of the adjustable mounting plate for the torpedo anchoring shear pin;

Figure 12 is a fragmentary detail sectional view, on an enlarged scale, of the muzzle end of the tube and the cover therefor and associated parts, certain parts being shown in elevation;

Figure 13 is a plan view of the under carriage and associated parts for supporting and training the tube, certain parts being broken away;

Figure 14 is a fragmentary detail sectional view, on an enlarged scale, taken substantially on line 14—14 of Figure 13;

Figure 15 is a sectional view taken substantially on line 15—15 of Figure 14;

Figure 16 is an after end view of the outboard stop member for the under carriage;

Figure 17 is a view, partly in lengthwise axial section and partly in elevation, with certain parts broken away, of one of the recoil take-up legs;

Figure 18 is a side view, with parts broken away, of the recoil leg of Figure 17, with a portion of the cylinder broken away and shown in section, also showing in section the associated vent means;

Figure 19 is a plan view, on an enlarged scale, of the slide plate and adjusting screw and associated parts, at the forward end of the under carriage, for effecting adjustment of the carriage and training of the tube;

Figure 20 is a sectional view, on an enlarged scale, taken substantially on line 20—20 of Figure 2A, certain parts being broken away;

Figure 21 is a view, partly in section and partly in elevation, of the slide plate and the screw adjusting means therefor as viewed from the forward end of the tube; and Figure 22 is a semi-diagrammatic view of the means for operating the adjusting screw, from within the housing of the boat, for training the tube.

The tube comprises a cylindrical body 25 of uniform diameter rolled from one or more sections of light gauge steel plate, welded together, and smoothly and accurately finished, care being taken that this body is of uniform diameter and straight throughout its length. For an 18-inch tube—that is, a tube 18 inches in diameter—⅛" plate is employed. Suitably spaced reenforcing rings 26, formed of light steel and of T section, accurately rolled or formed to fit body 25, are disposed about the latter, with the stem of the ring seating upon body 25 and welded thereto. One of the rings 26 is disposed in proximity to the muzzle end of the tube. Rings 26 materially reenforce body 25 and assist in maintaining the required tubular section thereof. The body 25 is further reenforced by forward and after saddles 27 and 28, respectively, fitting accurately about the upper portion of body 25 and welded thereto. Saddle 27 comprises a base 29 provided, at each side of the body 25, with a sole plate 30 of considerable area, and arched ribs 31 of T section extending along the forward and after edges of base plate 29 and welded thereto and to the sole plate 30. Saddle 27 is further provided, at each side of the body 25, with a bracket structure comprising a bolting plate 32 extending substantially horizontally outward from sole plate 30 and disposed somewhat above the center of body 25. The after saddle 28 is similar in construction to saddle 27 and comprises a base plate 33, reenforcing ribs 34 of T cross-section, sole plates 35, and brackets comprising bolting plates 36. The respective saddles 27 and 28 have a considerable area of contact with the body 25 of the tube, providing effective reenforcements therefor, and eliminate possibility of local distortion of the tube in the support thereof by the supporting means, to be described presently. The length of the tube is somewhat greater than the length of a standard naval torpedo to be discharged therefrom, and the interior diameter of body 25 of the tube is such as to provide about .075" clearance about the cylindrical middle portion of the fully charged torpedo. This relatively close fit affords an adequate gas seal sufficient to assure efficient propulsion of the torpedo when gas pressure is applied at the breech or after end of the tube, no sealing rings or similar members being required.

A breech ring 40, formed of an aluminum alloy and adequately ribbed for strength, is secured tightly upon the after or breech end of tube body 25 in a suitable manner, as by means of a large number of countersunk rivets. A breech door 41, also formed of an aluminum alloy and deeply ribbed for strength, is mounted upon ring 40 by means of a double jointed hinge 42 of known type. A rubber sealing ring 43 (Figure 4) is cemented in a groove formed in the forward or inner face of door 41 for sealing contact with the after end of breech ring 40. Swing bolts 44, pivoted at their forward ends at 45 to breech ring 40, are engageable in outwardly opening slots 46 in door 41. Bolts 44 carry wing nuts 47, which bear against wear plates 48 at the after or rearward face of door 41 extending about slots 46, for securing the door in closed position. When door 41 is closed, the rubber sealing ring 43 seats against the flat annular face on the after end of ring 40, and a moderate force exerted by the bolts 44 and nuts 47 suffices to seal the breech end of the tube body 25 against an interior pressure of about seventy-five pounds per square inch, such as is developed within the pressure space or chamber of the tube when discharging a torpedo therefrom. The door may readily be opened and closed in an obvious manner.

Door 41 is provided with a central tubular hub 50, the after end of which may be closed by a screw plug 51 having a flange 52 at its after end, between which flange and the after end of hub 50 a sealing gasket 53 is interposed. Plug 51 is hollow and open at its forward end, and is suitably bored and tapped at its after end for reception of a screw plug 54. The provision of the hub 50 and the plugs 51 and 54 renders it possible, when desired, to connect to the pressure chamber of the tube a pressure and speed indicator of standard design, such as is commonly used for experimental investigations. An annular spacing member 55, of predetermined thickness, is removably attached to the forward end of hub 50 by screws 56, so as to be readily removable and replaceable. Member 55 provides means for assuring that the torpedo is correctly located axially relative to the body 25 of the tube, when loaded in the latter, as will be further explained presently.

Breech ring 40 is provided, at its upper portion and at each side of its vertical axial plane, with an integral block 60 suitably reenforced and provided at its upper end with a flat bolting flange, as shown in Figure 3. Block 60 defines a passage 61 (Figure 5) which registers at its lower end with a corresponding opening 62 through body 25 of the tube. Block 60, at the outboard side of breech ring 40, is closed at its upper end by a cover plate 63 bolted thereto, with an intervening sealing gasket 64. Block 60, at the inboard side of ring 40, receives a combustion chamber 65 having a depending tubular neck 66 seating upon and bolted to block 60, with an intervening sealing gasket 67. As previously stated, the torpedo tubes of my invention are intended for use with high speed surface vessels, and are disposed at opposite sides of the deck extending generally fore and aft thereof. The inboard side of the tube will depend upon which side of the deck the tube is adjacent, and by providing the two blocks 60, the combustion chamber 65 may be mounted at the inboard side of the respective tubes, avoiding necessity for providing right and left tubes.

A torpedo is expelled from the tube by means of a powder charge, the explosion proper being confined to the combustion chamber 65 which is formed as an integral casting suitable for withstanding high pressures. An orifice member 68, flanged at its upper end and seating in the upper end of neck 66, extends downwardly within the neck, within which it fits snugly, and is removably secured in position by a set screw 69 threading through neck 66. Member 68 is in the form of a Venturi tube and provides a throttling orifice of predetermined size for metering the flow of high pressure gases within combustion chamber 65 from the latter into the pressure space or chamber within body 25 of the tube at the breech end thereof.

The explosion pressure within the combustion chamber 65 normally is about 1200 pounds per square inch. A slow burning type of powder is used, and the pressure rise to its maximum is relatively slow and not of the nature of a detonation. The entire period of rise and fall of pressure within the combustion chamber 65 occupies about .5 second, and the maximum pressure is maintained for about .2 second. There are various factors which determine the proper size of the orifice of member 68. The proper discharge velocity for the torpedo, for example forty feet per second, is first determined. Sufficient momentum would be imparted to the torpedo to produce the desired velocity if a moderate pressure, for example forty pounds per square inch, were applied to it uniformly for approximately two-thirds of its travel within the body 25 of the tube. The maintenance of a low and uniform pressure is an ideal. Actually, the tube pressure will rise to a peak as gas enters the pressure chamber of the tube from the combustion chamber 65, and will then decrease in substantially the same manner as the cylinder pressure decreases in an internal combustion engine during the expansion stroke of the piston. A peak pressure of about seventy pounds per square inch within the pressure space or chamber of the tube is permissible. It is desired to secure a flat tube pressure diagram, the pressure acting with a minimum peak value, but over as great a length of torpedo travel as is possible. That is to say that the ideal constant and relatively low tube pressure is to be approached as nearly as is practicable. The controlling of the form of the tube pressure diagram involves proper selection of the powder charge as to quality and weight, and selection of an orifice member 68 having an orifice of proper diameter. For a given powder charge, a small orifice will cause the tube pressure to rise slowly and to a low figure, and the combustion chamber pressure to rise rapidly and to a maximum relatively high value. A large orifice will permit rapid transfer of gas from the combustion chamber to the pressure chamber of the tube body, with a consequent increase in pressure in the tube pressure chamber and decrease in pressure in the combustion chamber. An acceptable compromise is arrived at by experiment.

The powder charge is carried in a 3" cartridge case of a Navy standard type. The powder used is known as a stabilized glass powder. The required weight of powder is found by experiment, and is governed by the considerations above outlined, namely, imparting sufficient momentum to the torpedo without imposing an excessive peak pressure upon the torpedo tube proper. When a suitable combination of weight of powder charge, orifice diameter, tube pressure, and torpedo velocity has been secured, it may then be found that the maximum pressure within the combustion chamber 65 is high, as, for example, 1500 pounds per square inch instead of 1000 to 1200 pounds. That condition is not prohibitive, however, since the combustion chamber can, without difficulty, be designed for high pressures, due to its small dimensions and the relatively slight amount of material involved.

The powder charge, as above stated, is carried in a cartridge case 70 of a standard Navy type, fitted with a primer loaded with about one ounce of fine black powder and with a small electrical resistance coil in direct contact with the priming charge. The ignition system causes flow of electrical current through the resistance coil, igniting the priming charge and, in turn, the main powder charge. Since the cartridge is of known type, it need not be illustrated nor described in greater detail. Cartridge 70 and its contained powder charge provide means for generating, within combustion chamber 65, gases under high pressure, which gases flow through the throttling orifice member 68 into the pressure chamber of tube body 25 as and for the purpose stated. Within the broader aspects of my invention, any other suitable means may be provided for generating, within combustion chamber 65, gases under relatively high pressure.

Combustion chamber 65 is provided, at its after end, with an opening normally closed by a screw plug 71, with provision for effecting a fluid-tight and pressure-resistant seal between this plug and the combustion chamber. Chamber 65 is further provided with an opening at its upper portion normally closed by screw plug 72. The plugs 71 and 72 afford means for connecting to the chamber 65, when desired, suitable testing instruments. At its forward end, combustion chamber 65 is provided with an opening through which fits the after end portion of a breech member 73 provided with an outer circumferential flange 74 by means of which member 73 is bolted to the end of combustion chamber 65. Flange 74 is provided, at its rearward or after face, with a shoulder 75 extending into a corresponding recess in the adjacent end of combustion chamber 65, sealing gaskets 76 and 77 being interposed between flange 74 and the end of chamber 65, and shoulder 75 and the corresponding portion of the end wall of chamber 65, assuring a fluid-tight and pressure-resistant closure between the combustion chamber and the breech member 73. The latter member defines a chamber which receives and supports the cartridge 70, as will be clear from Figure 5.

Breech member 73 receives a cooperating breech block 80, member 73 and block 80 being provided with interrupted and interengageable threads for locking them together, the arrangement being similar to that employed in gun breech mechanism of known type, and requiring no detailed description. Suffice it to state that suitable quick detachable and attachable means is provided for securing the breech block upon and removing it from the breech member 73.

The breech block 80 carries a firing pin and associated elements of the ignition system, the latter being of known type, a brief description of which will suffice. Breech block 80 is provided with a forwardly extending neck 81 which receives means slidably supporting a firing pin 82 and electrically insulating it from breech block 80 and neck 81 thereof. Firing pin 82 is yieldingly urged toward the rearward or after end of breech block 80, by a compression spring 83, means being provided for positively limiting rearward movement of the firing pin when the breech block is removed from breech member 73, as will be clear from Figure 5. In the latter figure, breech block 80 is shown in its operative position secured upon breech member 73, at which time the after end of firing pin 82 is held by spring 83 in contact with the head of cartridge 70 at the center thereof. A collar 84 is secured by screws, or in any other suitable manner, upon the forward portion of neck 81, and carries a forwardly extending bifurcated bracket 85, in the forward end of which is pivoted, by a pin 86, an arm 87. A head 88 is carried by arm 87, at the inner end thereof, this head being provided with electrical insulating means which slidably supports a contact pin 89 yieldingly urged toward the after end of head 88 by a compression spring 90, and held thereby in contact with the forward end of firing pin 82. An electric cable 91, provided with a protecting moisture-tight armor, is connected to the forward end of contact pin 89, and passes through a stuffing box 92 of known type, carried by a housing 93 secured to the forward end of breech block 80 and forming therewith a moisture-tight enclosure for the firing pin 82, contact pin 89, and associated parts of the ignition means. Cable 91 passes to a suitable location within the housing of the vessel, and is connected to a switch of known type for closing the electrical circuit. A setting pin 94 is pivoted at its forward end, by a pin 95, to arm 87 outwardly thereof beyond pin 86. Setting pin 94 operates through a bore 96 in the forward end of breech block 80, and, in the operative position of breech block 80, is held in contact with the forward end of breech member 73 by a tension spring 97 anchored, at its forward end, to the outer end of a finger 98 extending outward from arm 87 and, at its after end, to breech block 80 by means of an eye member 99.

Breech block 80 is provided with two handles 100 for convenience in manipulating it, and is attached to combustion chamber 65 by a chain 101 (Figures 1 and 2) the ends of which are suitably secured to eye members 102 and 103, respectively secured to the combustion chamber 65 and breech block 80. Housing 93 is provided, at its forward end, with a ring 104 welded thereto, this ring providing an opening closed by a removable cover plate 105 secured to the ring by screws, or in any other suitable manner, with an intervening sealing gasket 106. Removal of plate 105 gives ready access to the means for connecting the cable 91 to the forward end of contact pin 89. In order to remove breech block 80 from breech member 73, the block is turned through an arc of approximately 60 degrees, so as to bring the threads thereof into alignment with the spaces between the sets of interrupted threads on the breech member 73. This turning of block 80 causes entry of the after end portion of setting pin 94 into a groove 107 formed in the forward end of breech member 73 concentric therewith, shown in Figures 6 and 7. That permits movement of pin 94 toward breech member 73 with consequent rocking of arm 87 about pivot pin 95 in a counterclockwise direction, as viewed in Figure 5, by tension spring 97, thus swinging head 88 forward sufficiently to move pin 89 out of contact with pin 82. That provides a safety feature which eliminates possibility of accidental firing of the cartridge when the breech block is detached from the breech member. When the breech block has been thus detached from member 73, it may readily be removed therefrom in an obvious manner, for removal of a cartridge which has been fired, or for insertion of a cartridge in the breech member 73, after which the breech block may be replaced in an obvious manner. The cartridge may be inserted one or two hours in advance of its expected use, since the igniting means is effectively shielded from splash and moisture by the housing 93 and associated parts. This housing remains in position and closed, once the proper adjustments of the ignition means have been effected, and need not be removed except at intervals for adjustment or inspection. Once a cartridge has been inserted and the breech closed, there is no need for personnel to remain at this station. Accordingly, the personnel may remain shielded within the housing of the vessel, from within which the cartridge may be fired for expelling the torpedo from the tube, when desired. It will thus been seen that the torpedo tube, including the means for ejecting or discharging the torpedo therefrom, constitutes a unit complete in itself which is self-contained and is not dependent upon a supply of compressed air for ejecting the torpedo.

Referring to Figures 1, 2, and 9, two angle guide strips 108 are mounted within the breech portion of body 25 of the tube, to which strips 108 are secured in a suitable manner, conveniently by bolting. Each of these strips provides a substantially horizontal guide flange disposed a short distance above the horizontal axial plane of body 25 of the tube, and curves upward and forward thereof at its forward portion. Strips 108 are so disposed as to be located at the tapering after portion of a torpedo loaded in body 25 of the tube. When loading the torpedo, the breech door 41 is opened and the torpedo is inserted into the body of the tube from the muzzle end thereof, being guided with care to assure that the horizontal rudder posts of the torpedo engage correctly beneath the flanges of strips 108, the latter being appropriately disposed to that end. When the horizontal rudder posts of the torpedo pass beneath the guide strips 108, the breech door 41 is closed and the insertion of the torpedo continues until it stops against the annular spacing member 55 carried by the door 41. Member 55 thus serves to limit the insertion of the torpedo into the body of the tube and to position it in proper axial relation thereto, the guide strips 108 assuring positioning of the torpedo in proper angular relation to the tube body 25, as will be understood.

After the torpedo has thus been properly positioned within the body of the tube, it is secured against displacement due to pitching of the vessel or like causes, by suitable anchor means which will now be described. The standard naval torpedo carries a T shaped lug attached thereto by three screws threaded into tap holes in the vertical axial plane of the torpedo and about midway of its length, the T shaped lug being disposed at the cylindrical body portion of the torpedo and extending lengthwise thereof. In conventional torpedo tubes, this lug rides in a slot in the tube, this slot cooperating with the lug to support the torpedo when at rest and to guide it during discharge. The torpedo tube of my invention has no such slot, and the lug is removed from the torpedo before inserting it into the body of the tube, leaving uncovered the three holes at the top of the torpedo body. When the torpedo is properly positioned within the body of the tube, one of the holes referred to receives cylindrical head 110 (Figure 10) of a shear pin 111 comprising a threaded body 112 to which head 110 is connected by a reduced neck 113, body 112 being provided, at the upper end of neck 113, with a hexagonal flange 114. Body 112 of pin 111 screws into a socket member 112a secured in a disk-shaped adjusting plate 115. Conveniently, socket member 112a is threaded into plate 115 and is anchored therein by distorting the threads with a prick punch or other suitable instrument, though it will be understood that the socket member may be secured to plate 115 in any other suitable manner, or, if desired, plate 115 may be suitably bored and tapped, and the body of pin 111 screwed directly into this plate.

Plate 115 seats on an annular base plate 116, with an intervening sealing gasket 117, base plate 116 being machined to seat accurately upon the top of tube body 25 to which it is secured by screws or in any other suitable manner. Bolting studs 118 are secured in base plate 116 and extend upwardly through openings 119 in plate 115 of materially greater diameter than the studs 118, providing considerable clearance about the latter. A washer disk 120 seats upon the top of adjusting plate 115 and is confined between the latter and wing nuts 121 screwing upon the upper ends of studs 118. Plate 116 is provided with a central opening 122 of considerably greater diameter than socket member 112a, this opening registering with an opening 123 through the top of tube body 25 of considerably greater diameter than neck 113 of pin 111, preferably of the same diameter as opening 122. The clearance thus provided about the pin and the socket member, and the clearances provided about the stud bolts 118, permit of adjustment of the shear pin in eccentric relation to the openings 122 and 123.

Preliminary to inserting the torpedo into the tube, adjusting plate 115 and the shear pin 111 carried thereby are removed from the tube. After the torpedo has been positioned properly within body 25 of the tube, adjusting plate 115 is replaced, with head 110 of pin 111 extending into one of the tapped holes at the top of the body of the torpedo with but slight clearance, and is secured tightly in position by means of the bolting studs and the wing nuts. On a standard torpedo the distance from the tail end to a selected tapped hole is accurately controlled, though there may be slight dimensional variations in different torpedoes of the same type and size. Ordinarily, the selected hole into which the head of pin 111 is to be inserted should appear at the center of opening 123, but, due to the slight variations referred to, it may appear somewhat eccentric to opening 123. The clearances provided by openings 119, about the bolting studs 118, and the clearances provided by the openings 122 and 123 about the socket member 112a and the neck 113 of pin 111, permit of plate 115 being adjusted to compensate for such eccentricity and tightly secured in position. It is contemplated that the clearances referred to will accommodate an eccentricity of, for example, $\frac{1}{16}$ of an inch in any direction without interfering with the insertion of the head of the shear pin into the hole in the torpedo and bolting down of adjusting plate 115.

When the plate 115 has been tightly secured in position, pin 111 effectively prevents any objectionable motion of the torpedo within tube body 25 due to ordinary causes, such as pitching of the vessel and the like. The cross-section of neck 113 of pin 111, and the material of the pin, are such that the latter has adequate mechanical strength to anchor the torpedo against movement under ordinary conditions, while assuring that the head of the pin will be sheared off cleanly at the neck 113 when the torpedo is discharged from the tube. The material from which the shear pin 111 is formed is carefully selected so as to have adequate strength but not great ductility, thus assuring a clean shear. High tensile aluminum alloy bar stock of about 10% elongation has been found suitable. The pin 111 and associated parts are so related that the neck 113 of the pin is nearly flush with the outer cylindrical surface of the torpedo as the latter rests within the tube. When the torpedo is discharged, head 110 of the pin is sheared off at neck 113 and is carried out of the tube with the torpedo. Preliminary to discharging a second torpedo, the plate 115 is removed from base plate 116 and the remainder of the shear pin 111 is detached from plate 115 by applying a wrench or other suitable tool to the hexagonal flange 114, and is replaced by a new shear pin.

Means in the form of a tripping latch, is provided for throwing the firing lever of the torpedo, for setting the torpedo self-propulsion mechanism in action in a known manner, during the initial portion of the travel of the torpedo through the body 25 of the tube as it is discharged therefrom. A base flange 125, shaped to fit accurately upon the upper portion of tube body 25, is secured to the latter by screws, or in any other suitable manner. A housing 126 is bolted on base flange 125, with an intervening sealing gasket 127.

Housing 126 comprises a body 128 of cylindrical shape with suitably disposed reenforcing webs 129, and an annular base member 130, secured by screws or in any other suitable manner to the lower end of body 128, base member 130 being provided with a concentric collar 131 fitting snugly in the lower end of body 128 and in a corresponding bore in the flange 125. A cylindrical trip member 132 is slidable through collar 131 and through a corresponding opening provided in body 25 of the torpedo tube. At its upper end the trip member is provided with a hollow cylindrical extension 133 which fits snugly within body 128 for sliding movement therein, and is confined against relative turning movement by a dog pointed screw 134 threaded through boss 135 of body 128, the point of this screw engaging into a slot 136 in extension 133, terminating short of the upper end thereof. At its lower end trip member 132 is formed to provide a detent 137, the rearward or after face of which is disposed radially of tube body 25, the forward face 138 of this detent being inclined upward and forward of body 25. A bolt 139 is slidably mounted through top end wall 140 of housing 126, this bolt being provided at its upper end with a vertically flattened head 141 which, in the innermost position of bolt 139, may seat against the upper face of wall 140. The lower portion of bolt 139 has threaded connection with latch member 132, and this bolt normally is confined against rotation by a dog pointed screw 142 threaded through a boss 143 of housing 126, with the point of this screw extending into a vertical groove 144 in the shank of bolt 139. A coil compression spring 145 is disposed about bolt 139, within housing 126, and is confined between upper end wall 140 thereof and the lower end wall of extension 133 of latch member 132. This spring 145 urges latch member 132 and bolt 139 downward into the position shown in Figure 8, with detent 137 projecting into body 25 of the tube. Head 141 of bolt 139 is pivoted, by a pin 146, to one end of an operating and adjusting lever 147 eccentrically thereof. This lever comprises two side plates 148 and a spacer 149 riveted or otherwise suitably secured therebetween. The ends of plates 148 adjacent bolt head 141 are rounded to provide cam surfaces. When lever 147 is in its position shown in Figure 8, latch member 132 is projected into its operative position, with detent 137 projecting into body 25 of the tube. By turning lever 147 through 180 degrees into the opposite position to that shown in Figure 8, the rounded ends of plates 148 exert a camming action on the upper face of wall 140, thus forcing the bolt 139 outward and retracting trip member 132 into its outer or inoperative position, in which the detent 137 is disposed to clear the firing lever of the torpedo. By turning screw 142 outward sufficiently to withdraw the point thereof from groove 144, bolt 139 may be rotated by means of lever 147 in proper direction to cause either relative inward or outward movement of the latch member 132, thus effecting adjustment thereof to assure proper operation of the torpedo firing lever when the latch member is in its projected operative position. After the desired adjustment has been effected, screw 142 is turned in to hold the bolt 139 against rotation.

The firing lever of the standard Naval torpedo is disposed to one side of the vertical central plane of the torpedo a certain distance, for example approximately ¾ of an inch, and is situated on the after body of the torpedo, which after body tapers toward the tail, so that the diameter of the body of the torpedo in the plane of the firing lever is less than the maximum diameter which obtains throughout the main cylindrical body portion of the torpedo. This tapered after body of the torpedo is provided with a recess extending forward of the firing lever, into which detent 137 of the trip member 132 extends, when the torpedo is positioned properly within the body 25 of the tube and the trip member is projected into its inner or operative position, it being understood that the trip member is offset from the central vertical plane of the torpedo correspondingly to the offset of the torpedo firing lever and the associated recess. When trip member 132 is in its projected operative position, detent 137 is disposed about ¼ of an inch forward of the torpedo firing lever and overlaps the latter about ⅛ of an inch substantially radially of the tube body 25.

In the initial forward travel of the torpedo within the tube, on its discharge, detent 137 of latch member 132 serves to trip the firing lever of the torpedo so as to set the self-propulsion mechanism thereof in action in a known manner. In the continued forward travel of the torpedo the detent 137 causes no interference with the torpedo body itself, due to the rearward taper of the after portion thereof. But the vertical rudder posts of the torpedo, located at the tail thereof, extend substantially the full diameter of the main cylindrical body portion of the torpedo. Offsetting the trip member to one side of the central vertical plane of the tube and of the torpedo, in the manner stated, prevents interference between detent 137 and the vertical rudder post. The distance forward to which the guide strips 108 of Figures 1 and 2 may extend is limited by the length of the tapering after portion of the torpedo body. For that reason, after the horizontal rudder posts pass from beneath the guide strips 108, the torpedo will travel a distance of approximately eight inches within the tube body 25 before the vertical rudder post passes forward beyond the detent 137. It might be thought that there would be risk of the torpedo turning in the tube a sufficient distance, approximately 5/16 of an inch measured on the circumference of the main cylindrical body of the torpedo, to bring the vertical rudder post into such position that it would strike the detent 137. However, the torpedo is discharged from the tube at a velocity of approximately forty feet per second, which means that it travels eight inches in approximately 1/60 of a second, and there are no forces tending to cause rotation of the torpedo within the tube. Experience has demonstrated that no such rotation of the torpedo occurs and that no risk is involved in having the torpedo travel that short distance free of the guide strips. Though not essential, it is preferable that the trip member 132 be retracted into its inoperative position during insertion of the torpedo into the tube. Also, the trip member preferably is retained in that position during ordinary cruising, since it may quickly be projected into operative position, merely by turning of the lever 147 into the position shown in Figure 8, preparatory to discharge of the torpedo.

It is desirable that entry of moisture into the body 25 of the torpedo tube be prevented, and it has been found that a rather tight seal is necessary to prevent the entrance of water due to splash. The muzzle end of the tube is closed by a dome-shaped cover 150 provided with an outwardly projecting circumferential flange 151 to the after face of which is secured a channel member 152 carrying a soft rubber sealing ring 153. Cover 150 is further provided with suitably spaced, outwardly projecting brackets 154 having openings through which extend rods 155 each of which is urged forward by a compression coil spring 156, confined between a knob 157, secured on the forward end of rod 155, and a collar 158 disposed about and free from rod 155, this collar being provided with a boss 159, the after end of which is rounded and seats in a corresponding recess in bracket 154. Spring 156 is disposed about rod 155 and is enclosed within a cylindrical casing 160 secured to and extending forward from collar 158. The rearward or after portion of rod 155 is bent at a slight angle to the remainder of said rod, and is provided with a hook element 161 for engagement with the after portion of the flange of reenforcing ring 26 adjacent the muzzle end of the tube. Guide fingers 162, secured within cover 150, are disposed to enter the muzzle end of the tube and center the cover thereon. When cover 150 is on the tube, sealing ring 153 is held in tight contact with the end of the tube, by means of the springs 156, the cover and the sealing ring thus providing a water tight closure for the muzzle end of the tube. When a torpedo is loaded in the tube and the latter is ready for use, the cover 150 is, of course, removed and may be stowed in any convenient location for use as desired.

The torpedo tube is mounted, for vertical swinging movements and for training, on an under carriage. This carriage comprises a turntable 165, a slide plate 166, mounted for movement concentrically with the turntable, and a rigid frame 167 secured at its after end to the movable member of the turntable and, at its forward end, to plate 166, as shown in Figure 13. The turntable 165 comprises an inner fixed member 168 (Figure 9) secured in any suitable manner, as by means of a large number of screws (not shown), to a reenforced portion of deck d of the vessel, and an outer member 169 mounted for rotation on member 168. Preferably, the turntable members 168 and 169 are formed of aluminum alloy and are adequately ribbed for strength, with a view to lightness of construction. A sheet metal cover plate 170 is suitably secured, as by screws, to the top of turntable member 169, extending thereover and over member 168 to exclude water from these members. Cover 170 is provided with a diametrically extending trough-shaped element 171 which accommodates a downwardly arched bridge member 172, preferably of I cross-section, welded or otherwise secured at its ends to the lower portions of rocker arms 173, preferably of tubular construction for the major portion of their length. Arms 173 are provided at their ends with eye members 174 and 175, members 174 being pivoted, by pins 176, to turntable member 169 on aligned axes extending diametrically thereof. The eye members 175, at the upper ends of arms 173, are pivoted, by pins 177, in slotted blocks 178 bolted to bolting plates 36 of the after saddle 28. The arms 173 are disposed at opposite sides of the body 25 of the tube, and the pivot axes at the upper ends thereof are aligned transversely of the tube body, as will be clear from Figures 1, 2, and 9. Suitable means, of known type, is provided for restraining the pivot pins 176 and 177 against endwise displacement.

Suitable means is provided for restraining turntable member 169 against upward movement relative to member 168. Conveniently, square-headed bolts 180 (Figures 9 and 13 to 15, inclusive) are secured in member 169, the heads of these bolts fitting in substantially rectangular slots 181 extending circumferentially of member 168. These bolts are not intended to limit turning movement of member 169, other means being provided for that purpose, as will be hereinafter described. Any suitable number of bolts 180 may be provided, though ordinarily I provide three of these bolts equally spaced about the turntable. Any other suitable means may be provided for preventing upward movement of member 169 relative to member 168.

Frame 167 comprises rails 182, preferably of tubular construction, provided at their forward and after ends with eye members 183 and 184, respectively. Rails 182 are connected by cross braces 185, 186, and 187, also preferably of tubular construction, secured thereto in any suitable manner, conveniently by welding. The frame thus formed is of comparatively light construction, while possessing adequate strength and rigidity. Eye members 184 are secured to turntable member 169, at opposite sides of the axis thereof and forward of pins 176, by pins 188 inserted through lugs 189 of turntable member 169 and through the eye members 184. Eye members 183, at the forward ends of the rails 182, are bolted to slide plate 166 at the after portion of the latter. A hook-shaped stop member 190, shown more clearly in Figures 13 and 16, is secured to deck d at the outboard side of frame 167, for contact with the outboard rail 182, for limiting outboard swinging movement of frame 167, the slots 181 being of sufficient extent to permit such movement of frame 167 into contact with stop member 190, bolts 180 not functioning as stop members, as above stated.

Slide plate 166 is provided, at its upper face, with three upwardly opening bearing blocks 191, 192, and 193, blocks 191 and 192 being disposed in substantial alignment with eye members 183 at the forward ends of rails 182 of frame 167. A shaft 194 is rockably mounted in bearing blocks 191, 192, and 193, in which it is confined by cap plates 195 bolted to the bearing blocks, as shown more clearly in Figure 19. Suitably braced forward rocker arms 196 are secured to shaft 194, one at the outboard end of this shaft and the other between the bearing blocks 192 and 193. Shaft 194 is confined against endwise movement through the bearing blocks by stop collars 197 and 198 secured thereon, or in any other suitable manner. The arms 196 are of tubular construction for the major portion of their length, and each is provided, at its upper end, with an eye member 199, as shown in Figure 2A. This eye member 199 extends upward into a slotted block 200 bolted to bolting plate 32 of the forward saddle 27, to which block eye member 199 is pivoted by a pin 201. In the normal position of the tube, the after rocker arms 173 and the forward rocker arms 196, the latter of which are disposed at opposite sides of the tube body in the same manner as arms 173, are inclined upward and forward of the tube body 25, as shown in Figures 2 and 2A. Preferably, rocker arms 173 and 196 are of equal length, providing a parallel linkage between the tube body 25 and the under carriage therefor, permitting of fore and aft swinging movement of the tube body in a vertical plane, as will be described more fully hereinafter. When the tube is in its normal forward lowered position, shown in Figures 2 and 2A, the lower portion thereof rests in forward and after cradles 202 and 203, respectively, welded or otherwise suitably secured to frame 167. The upper surface of each cradle is of concavo-convex shape transversely, to conform to the curvature of body 25 of the tube, and is provided with a pad 204 of soft rubber or other suitable material, upon which tube body 25 rests when in its lowered position, as shown in Figure 10. Cradles 202 and 203 rest upon suitable wear strips secured to deck d.

Recoil take-up legs 210 are disposed at opposite sides of tube body 25, as shown in Figures 1 and 1A, the after ends of these legs being pivoted to turntable member 169 at 211, as in Figure 2, and the forward end of each of these legs being pivoted at 212 to the slotted block 200, the respective legs 210 thus being disposed at an inclination upward and forward of the tube, as in Figures 2 and 2A. Each leg 210 comprises a cylinder 215 (Figure 17), in the forward end of which is secured a head 216 through which is slidably mounted a tubular piston rod 217, with provision for effecting a fluid-tight seal thereabout. Piston rod 217 is also slidable through a guide member 218 secured within cylinder 215 and provided with openings 219 establishing communication between the interior of the cylinder at the opposite sides of this guide member. The inner end portion of piston rod 217 receives a tubular neck 220, pinned or otherwise suitably secured therein, of a piston 221 operating within cylinder 215 and provided with cup leathers 222 assuring a fluid-tight seal between the piston and the cylinder in the inward travel of the piston. Piston 221 is of hollow construction and, at its outer or forward end, opens freely into neck 220 which, in turn, opens freely into the tubular piston rod 217. A flanged valve seat ring 223 is secured upon the inner end of piston 221 and provides a seat for cooperation with head 224 of a valve member having a hollow cylindrical body 225 extending into piston 221 in spaced relation thereto. Body 225 is provided with guide lugs 226 which guide the valve member in its movements in the piston 221, while holding body 225 in concentric spaced relation to the piston body, lugs 226 being spaced a considerable distance apart to permit of free flow of displaced liquid, about the body 225 of the valve member, into and through piston 221. Head 224 of the valve member is provided with a port or opening 227 disposed centrally thereof. In the normal open position of the valve member, shown in Figure 17, head 224 is spaced away from valve seat ring 223, providing a passage 228 of considerable area for flow of displaced liquid from cylinder 215 into and through the piston 221, the area of opening 227 relative to the area of passage 228 being quite restricted. At its forward end, cylinder 215 is provided with a fitting in the form of a vent plug 230, having suitable passages communicating with the interior of the cylinder, for venting to atmosphere air from within the cylinder in front of or forward of piston 221. Piston rod 217 is provided, a short distance from its forward end, with a collar 231, welded or otherwise secured thereto, this collar defining an opening normally closed by a screw plug 232. By removing plug 232, air at atmospheric pressure may be admitted to the interior of piston rod 217, for a purpose which will be explained presently. A light coil compression spring 233, disposed within the body of piston 221, is confined between the forward end of the latter and the forward end of body 225 of the valve member, yieldingly urging the latter rearward into its unseated or open position shown in Figure 17.

When the torpedo tube is in its normal, forward, lowered position, the legs 210 are extended, piston 221 of each leg being then in its outermost or forward position shown in Figure 17. Cylinder 215 of each leg contains a suitable working liquid, preferably oil, in amount sufficient to submerge piston 221 when the latter is in its normal, forward position. When a torpedo is discharged from the tube, the reaction of the pressure produced in the pressure chamber at the breech end of the tube body 25, causes the latter to swing upward and rearward in an arc. That causes shortening of the legs 210, by movement of the piston rod 217 inwardly of the cylinder 215, the legs turning or swinging slightly with the movement of the tube body 25. This movement of piston 221 inward of cylinder 215 is initially in the nature of a sudden or an abrupt thrust, and causes displacement of a small amount of the working liquid, preferably a light oil, through passage 228 and the piston 221. Immediately thereafter, the valve member is moved into closed position in opposition to compression spring 233, due to the pressure exerted by the oil against head 224. That closes the passage 228, and thereafter the oil flows through the restricted opening 227 into piston 221, and thence into the tubular piston rod 217. A high pressure will be built up in the cylinder 215 at the after portion thereof, since the force exerted against the pistons in the two legs 210 is substantially equal to the gas pressure exerted against the breech door of the tube body 25. The ratio of the cross-section of body 25 of the tube to the combined cross-sections of the two pistons 221 is approximately ten to one. Thus, if seventy pounds per square inch pressure is developed within the breech portion of body 25 of the tube, the resulting pressure within the legs 210 will be approximately 700 pounds per square inch. The rate at which the respective legs may be collapsed is determined by the rate at which the oil can flow through the restricted opening or orifice 227. The recoil of the tube body 25 will continue so long as the gas pressure persists within it, and as long as the tube momentum has not been overcome by the resistance offered by the recoil take-up legs. The total interval required for ejection or discharge of the torpedo is approximately .5 second. The size of orifice 227 and consequent recoil velocity is so chosen that approximately the full recoil travel of the tube body permitted by the rocker arms is utilized. It is preferable, however, to bring the tube to rest before it reaches its fully retracted position and contacts the cradles, so as to avoid objectionable shock, and the size of the orifice 227 is properly determined to that end. With the orifice 227 of the proper size, the characteristic recoil portion of the tube consists in a gradual acceleration to about five feet per second, an interval in which this velocity remains nearly constant, and a period of gradual retardation without shock, causing the tube to be stopped before it reaches its fully retracted position. During recoil of the tube, oil is forced through the orifices 227 into the otherwise closed hollow pistons 217, compressing the air within the latter. Compression of this air will continue as long as oil continues to pass through the orifices 227, this compression of air providing a storage of energy. Once the rearward recoil movement of the tube has been stopped, in the manner above described, the pressure exerted by the compressed air within the tubular piston rod 217, acting through the oil, initiates outward or forward movement of the piston 221 within the cylinder 215. That causes flow of oil from the piston rods into the cylinders, which results in opening of the valve members, comprising body 225 and head 224, thus permitting free flow of oil from the piston rods into the cylinders. Continued expansion of the compressed air imparts continued forward movement of the tube sufficient to restore it to its normal forward battery position resting within the cradles 202 and 203. The legs 210 thus provide means for taking up the recoil of the tube, during discharge of a torpedo therefrom, while also serving to restore the tube automatically to battery position. Each of the cylinders 215 is provided, in addition to the venting plug 230, with a drain cock 234 and with screw plugs 235 and 236 for filling with the oil and for venting during filling.

While I preferably provide the recoil takeup legs 210, which are constructed and operate in the manner above described, that is not essential to the broader aspects of my invention, within which any other suitable recoil takeup means may be employed. As previously stated, during discharge of the torpedo, the reaction on the breech door of the tube by the pressure generated therein causes the tube, with the contained torpedo, to swing upward and rearward. The recoil may thus, in large measure at least, be taken up by the weight of the tube and torpedo. It is practicable, therefore, to omit the recoil takeup legs 210 or like means, depending upon the weight of the tube and torpedo to take up the recoil. Preferably, in such cases, the weight of the tube and torpedo is such that the tube will not move rearward sufficiently to swing the rocker arms rearward beyond vertical position, so that the tube will return by gravity to its normal forward lowered position, though that is not essential. The pads 204 of the cradles 202 and 203 should be of suitable thickness or type to cushion the effect of the tube dropping into its lowered position, sufficiently to prevent subjecting the boat to objectionable shocks and stresses. That is true whether the tube returns by gravity to its normal forward lowered position, or moves rearward into lowered position, after discharge of the torpedo. If the tube is moved rearward into lowered position, when the torpedo is discharged, it is returned to its normal forward lowered position before another torpedo is loaded into and discharged from the tube, for obvious reasons. Return of the tube from its rearward to its forward position may be effected manually or by any suitable known means.

The forward slide plate 166 has its forward and after edges curved concentrically with the axis of turntable 165, this plate being slidably supported upon steel strips 237 disposed beneath the forward and after edge portions thereof and curved correspondingly thereto. Retaining guide strips 238, preferably formed of hard brass, seat upon the steel strips 237 and extend over the forward and after edge portions of plate 166, strips 238 conforming in curvature to the forward and after edges of plate 166. The retaining and guide strips 238 and the strips 237 are secured to a suitably reenforced portion of deck d of the vessel, by welding, bolting, or in any other suitable manner. Suitable clearances are provided between plate 166 and the retaining and guide strips 238 to accommodate relative expansion and contraction between the deck $d$ and the torpedo tube and parts associated therewith, and to permit easy sliding of plate 166 for training of the tube, as will be explained presently. Two reenforcing brackets 239 and 240 are secured to deck $d$, and overlie the outboard portion of the forward restraining and guide strip 238, these brackets being suitably ribbed for strength, and secured to the deck in any suitable manner, as by welding, bolting, or otherwise. Brackets 239 and 240 are so disposed as to be in substantial alignment with bearing blocks 191 and 192, respectively, of slide plate 166 when the latter is in its extreme outboard position. These brackets serve to restrain plate 166 against lifting movement which may be developed incident to ejection or discharge of the torpedo from the tube.

A bracket 241 (Figures 2A, 20, and 21) is bolted to deck $d$ adjacent the inboard end of the retaining and guiding strip 238, and, in part, overlying the latter. Bracket 241 is provided at its top with a bearing block 242 which receives a hollow spool member 243 restrained against upward movement by a cap plate 244 bolted to block 242. Member 243 is provided at its inboard end with an inwardly projecting stud 245 through which is secured a pin 246, the end portions of this pin projecting beyond the periphery of stud 245 for a purpose which will be described presently. Thrust rings 247, secured by screws or in any other suitable manner to the ends of block 242 and cap plate 244, cooperate with the flanges of the spool member 243 for confining the latter against endwise movement through block 242.

Spool member 243 is connected to the inboard end of a screw-shaft 248, by a universal joint structure 249 of known type. Structure 249 comprises a socket member 250 and a stud member 251, the latter extending into spool member 243 from the outboard end thereof and being secured therein by pins 252, or in any other suitable manner. Stud member 251 is provided with a flange 253 seating against the outboard end of spool member 243 for taking the inboard thrust of screw shaft 248. Socket member 250 receives the inboard end portion of shaft 248 secured therein by pins 254, or in any other suitable manner, this shaft being provided with a collar secured thereon seating against the outboard end of member 250 for taking inboard thrusts of the shaft. Shaft 248 threads through a sleeve nut 256 having top and bottom trunnions 257 and 258, respectively, pivoted in a bracket 259 bolted to slide plate 166 and a boss 260 extending from the forward face of this plate. The outboard portion of sleeve nut 256 is reduced in diameter and receives the inboard end portion of a tubular sheet metal housing 261, closed at its outer end, this housing being of proper length to accommodate the shaft 248 and serving to guard the latter against splash, particularly in the inboard position of the tube.

It will be seen that by rotating screw shaft 248 in the proper direction, the slide plate 166 may be moved either inboard or outboard for training the tube, this movement of the slide plate causing corresponding movement of the forward end of frame 167, thereby swinging the tube body 25, which normally rests in the cradles 202 and 203, about the axis of turntable 165. In that manner, training of the tube may readily be effected. In practice, two tubes are mounted adjacent each side of the deck of the vessel, these tubes being disposed generally in alignment fore and aft of the deck. Normally, the tube occupies a position substantially parallel with the adjacent side of the deck, in which it will offer minimum obstruction in the operation of the vessel. For loading, the tube is adjusted to an inboard position, which facilitates inserting the torpedo into the tube from the deck, particularly if the tube to be loaded is an after tube disposed adjacent another tube immediately forward thereof. For firing, the tube is adjusted to its outboard position, movement of the frame 167, and consequently of the tube, in an outboard direction being positively limited by the stop 190 in the manner previously described.

A tubular rod 265, mounted for rotation in a support 266 secured to deck $d$, is disposed with its outboard end fitting over stud 245, this rod being provided with two diametrically opposite T shaped slots 267 which receive the end portions of pin 246. At its inboard end, rod 265 is provided with a stud 268 through which is secured a pin 269. Stud 268 is intended for reception of the outboard end of a crank 270 provided, at that end, with two diametrically opposite T shaped slots 271 for receiving pin 269. The shank portion of crank 270 is insertible through a support 272 secured to deck $d$ in alignment with a sleeve 272ª secured through a wall of a housing 273 of the vessel, the handle portion 274 of the crank being disposed within this housing. Rod 265 is confined against endwise movement by stop collars 275 secured thereon abutting the ends of support 266. Rod 265 may remain permanently in position, the crank 270 being withdrawn from support 271 and sleeve 272 when not in use, and stowed in any convenient location within the housing 273. It is thus possible for personnel to train the torpedo tube from within the housing of the vessel, thus avoiding exposure of the personnel to the elements or to enemy fire during the operations of training the torpedo tube and discharging the torpedo therefrom.

As above indicated, and as will be understood by those skilled in the art, changes in construction and arrangement of parts of my invention may be resorted to without departing from the field and scope thereof, and I intend to include all such variations, as fall within the scope of the appended claims, in this application, in which the preferred form only of my invention has been disclosed.

I claim:

1. In combination, a torpedo tube, forward and rearward saddles secured to said tube, a turntable at the after portion of said tube, a plate forward of said turntable adjustable concentrically therewith, a rigid frame fixed at its after end to the movable member of said turntable and at its forward end to said plate, means for adjusting the latter, said frame comprising cradles receiving the lower portion of said tube when the latter is in lowered position, a forward pair of rocker arms normally inclined upward and forward of said tube pivoted at their upper ends to said forward saddle and at their lower ends to said plate, an after pair of rocker arms normally inclined similarly to said forward arms pivoted at their upper ends to said after saddle and at their lower ends to the movable member of said turntable, and a pair of recoil take-up legs inclined upwardly and forwardly of said tube pivoted at their forward ends to said forward saddle and at their after ends to said movable member.

2. In combination, a torpedo tube, an undercarriage therefor pivoted at its after end on a vertical axis at the after portion of said tube, a plate fixed to the forward end of said carriage adjustable about the axis thereof, means for adjusting said plate, the latter being provided with three bearings, two adjacent the sides of said tube and one spaced inboard from the bearing adjacent the inboard side of said tube, a shaft rockably mounted in said bearings, a forward pair of rocker arms normally inclined upward and forward of said tube connecting the latter to said shaft, an after pair of rocker arms normally inclined similarly to said forward arms connecting said tube to said carriage, and a pair of recoil take-up legs inclined upwardly and forwardly of said tube connecting the latter to said carriage.

3. In combination, a torpedo tube, an undercarriage therefor pivoted at its after end on a vertical axis at the after portion of said tube, a plate fixed to the forward end of said carriage adjustable about the axis thereof, guide means for said plate comprising a member overlying an edge portion thereof, a restraining member overlying said guide member and adapted for securement to a supporting structure for restraining said guide member against upward movement, means for adjusting said plate, linkage means connecting said tube to said carriage for relative forward and aft swinging movements, and recoil take-up means pivotally connecting said tube to said carriage.

4. In combination, a torpedo tube, means supporting said tube so as to permit upward and rearward recoil thereof, and recoil resisting means cooperating with said tube supporting means and comprising a cylinder, a tubular piston rod slidable through one end of said cylinder provided at its inner end with a hollow piston operating in said cylinder in sealing contact therewith and opening into the inner end of said rod, the latter being otherwise closed, the space in said cylinder between the other end thereof and the inner end of said rod when the latter is in its outer position being adapted to be filled with working liquid, and valve means controlling communication between said cylinder and piston movable by the pressure of said liquid and responsive to inward movement of said piston into one position providing a relatively restricted area of communication between said cylinder and piston and movable responsive to outward movement of said piston into a second position providing materially increased area of communication between said cylinder and piston.

5. In combination, a torpedo tube, means supporting said tube so as to permit upward and rearward recoil thereof, and recoil resisting means cooperating with said tube supporting means and comprising a cylinder, a tubular piston rod slidable through one end of said cylinder provided at its inner end with a hollow piston operating in said cylinder in sealing contact therewith and opening into the inner end of said rod, the latter being otherwise closed, the space in said cylinder between the other end thereof and the inner end of said rod when the latter is in its outer position being adapted to be filled with working liquid, and means providing communication between said cylinder and the inner end of said piston, said means comprising an inwardly opening and outwardly closing valve member slidable in said piston and defining therewith, when in open position, a passage for free flow of the working liquid, said means providing in the closed position of said valve member a relatively restricted passage for flow of the working liquid.

6. In combination, a torpedo tube, means supporting said tube so as to permit upward and rearward recoil thereof, and recoil resisting means cooperating with said tube supporting means and comprising a cylinder, a tubular piston rod slidable through one end of said cylinder provided at its inner end with a hollow piston operating in said cylinder in sealing contact therewith and opening into the inner end of said rod, the latter being otherwise closed, the space in said cylinder between the other end thereof and the inner end of said rod when the latter is in its outer position being adapted to be filled with working liquid, a valve seat member at the inner end of said piston, and a valve member comprising a body slidable in said piston defining therewith a passage for working liquid and a head at the inner end of said body cooperating with said seat member for closing said passage when said valve member is in closed position, said head being provided with a restricted opening communicating with the piston through said body.

7. In combination, a torpedo tube, means supporting said tube so as to permit upward and rearward recoil thereof, and recoil resisting means cooperating with said tube supporting means and comprising a cylinder, a tubular piston rod slidable through one end of said cylinder provided at its inner end with a hollow piston operating in said cylinder in sealing contact therewith and opening into the inner end of said rod, the latter being otherwise closed, the space in said cylinder between the other end thereof and the inner end of said rod when the latter is in its outer position being adapted to be filled with working liquid, a valve seat member at the inner end of said piston, a valve member comprising a hollow body open at its outer end slidable in said piston and defining therewith a passage for working liquid, said body being provided at its inner end with a head cooperating with said seat member for closing said passage when said valve member is in closed position, said head being provided with a relatively restricted opening into said body, and a compression spring confined between the outer end of said piston and said valve member body.

HUBERT SCOTT-PAINE.